United States Patent
Ma et al.

(10) Patent No.: US 6,820,147 B2
(45) Date of Patent: Nov. 16, 2004

(54) BIDIRECTIONAL SIGNAL TRANSMISSION OF EARPHONE JACK FOR DISC DRIVE

(75) Inventors: Chien-Chun Ma, Taipei (TW); Tung-Wei Kao, Taipei (TW)

(73) Assignee: Lite-On It Corporation, Taipei (TW)

( * ) Notice: Subject to any disclaimer, the term of this patent is extended or adjusted under 35 U.S.C. 154(b) by 17 days.

(21) Appl. No.: 10/303,543

(22) Filed: Nov. 25, 2002

(65) Prior Publication Data

US 2004/0039856 A1 Feb. 26, 2004

(30) Foreign Application Priority Data

Aug. 23, 2002 (TW) ........................ 91213156 U

(51) Int. Cl.⁷ ............................................. G06F 13/38
(52) U.S. Cl. .............................. 710/74; 710/69; 714/36
(58) Field of Search ....................... 710/69, 74; 714/36

(56) References Cited

U.S. PATENT DOCUMENTS 6,137,757 A * 10/2000 Kinoshita ................ 369/47.41
6,674,589 B2 * 1/2004 Min et al. ..................... 360/31

* cited by examiner

Primary Examiner—Jeffrey Gaffin
Assistant Examiner—Niketa Patel
(74) Attorney, Agent, or Firm—Thomas, Kayden, Horstemeyer & Risley

(57) ABSTRACT

A disc drive, which inputs and outputs signals by an earphone jack. The signal processing circuit includes a digital-to-analog converter, a memory for storing firmware programs, a signal switch device, and an earphone jack coupled to the signal switch device. When the signal switch device is coupled to the digital-to-analog converter, an audio signal is output from the disc drive through the earphone jack. When the signal switch device is coupled to the signal processing circuit, a digital signal is input or output to/from the disc drive through the earphone jack.

7 Claims, 2 Drawing Sheets

BIDIRECTIONAL SIGNAL TRANSMISSION OF EARPHONE JACK FOR DISC DRIVE

BACKGROUND OF THE INVENTION

1. Field of the Invention

The present invention relates in general to a disc drive, which inputs and outputs signals by an earphone jack. In particular, the present invention relates to a disc drive having a signal switch device, driving the earphone jack to output audio signals or non-audio signals and input non-audio analog or digital signals.

2. Description of the Related Art

During the design of a disc drive, the manufacturer must trace the behavior of the disc drive under different conditions and simulate controlled status of the disc drive thereby. However, input testing or variable adjustment signals and output testing signals between the conventional disc drive and the testing machine are through a signal bus. Additional I/O ports are required to allow transmission of more testing signals. However, the additional I/O port increases the cost of the disc drive, countering current trends toward lower priced disc drive.

SUMMARY OF THE INVENTION

The object of the present invention is to provide a switching device connected to the earphone jack of a disc drive for switching the earphone jack to output both audio or non-audio signals, and input non-audio analog or digital signals.

To achieve the above-mentioned object, the present invention provides a disc drive that inputs and outputs signals by an earphone jack. The disc drive comprises a digital-to-analog converter, a signal switch device, and an earphone jack coupled to the signal switch device. When the signal switch device is coupled to the digital-to-analog converter, an audio signal is output from the disc drive through the earphone jack. When the signal switch device is disconnected from the signal switch device, a digital signal is input or output to/from the disc drive through the earphone jack.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
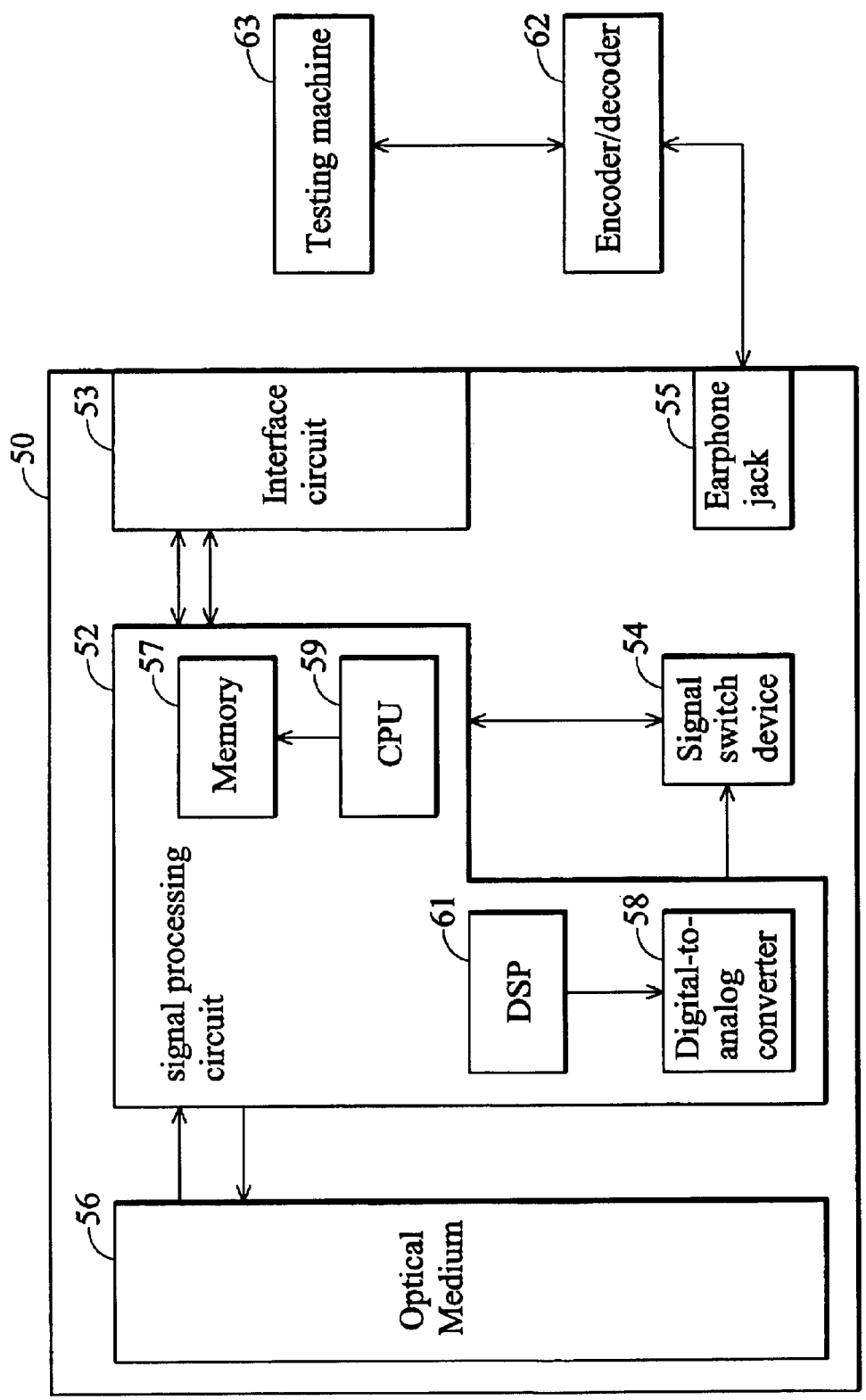
FIG. 1 is an architecture diagram of a disc drive according to the embodiment of the present invention.

FIG. 1 is an architecture diagram of a disc drive according to the embodiment of the present invention. The disc drive 50 according to the embodiment of the present invention comprises a signal processing circuit 52, an interface circuit 53, a signal switch device 54, an earphone jack 55 and an optical medium 56. The signal processing circuit 52 comprises at least a memory 57 for storing the firmware programs to control the disc drive, a digital-to-analog converter 58 a CPU 59 and a digital signal processor (DSP) 61.

When an audio signal is to be output from the disc drive 50, the CPU 59 couples the signal switch device 54 to the digital-to-analog converter 58. Thus, the audio signal is output from the earphone jack 55. Here, the audio signal is transformed from a digital audio signal recorded on the optical medium 56, processed by the DSP 61, then input to the digital-to-analog converter 58 for conversion to analog form. The audio signal output from the earphone jack 55 is one of the fundamental functions of a disc drive.

When a digital signal is to be output or input from/to the disc drive 50, the disc drive 50 is coupled to a testing machine through the earphone jack 53. Alternatively, the CPU 59 disconnects the signal switch device 54 from the digital-to-analog converter 58, and the digital signal is input through the earphone jack 55. According to the preferred embodiment, the digital signal can be a drive test signal.

When the CPU 59 receives the drive test signal, the CPU 59 performs tasks, for example, adjusting the firmware program stored in the memory 57 or changing the configuration of the disc drive 50. Next, the disc drive 50 generates another digital signal responding to the testing result using the drive test signal, and outputs through the earphone jack 55. The digital signal responding to the testing result may be output to the testing machine 63 through an encoder/decoder 62. When the testing machine 63 is a personal computer, the user can operate the personal computer to generate the drive test signal directly and obtains the testing result of the disc drive 50. Thus, behavior tracing of the disc drive under different conditions is obtained. In addition, non-audio digital signals can be input or output through the earphone jack 55. Thus, signals are accessed through the earphone jack 55, which only outputs audio signals in the prior art.

Figure 2:
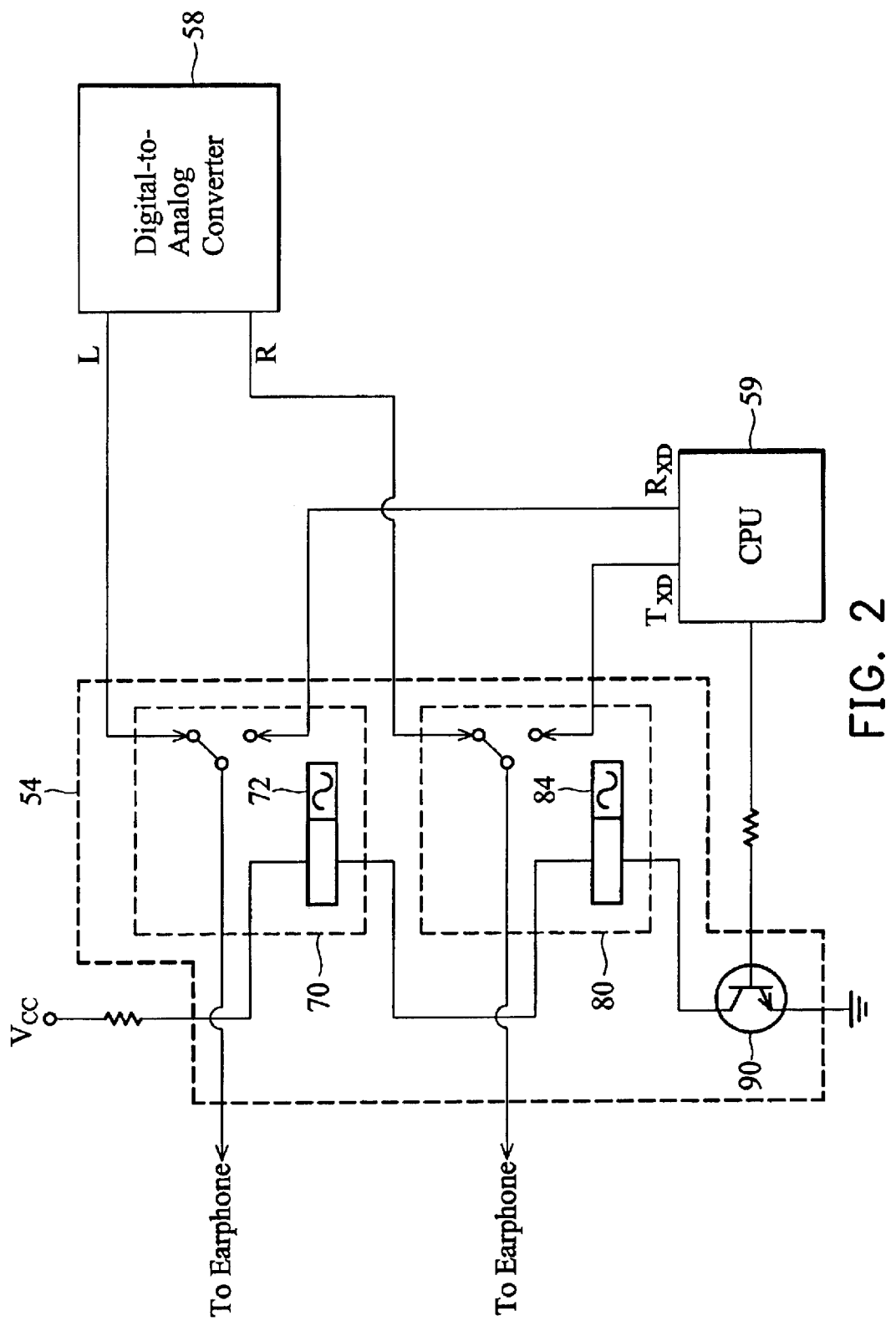
FIG. 2 is a detail architecture diagram of the signal switch device according to the embodiment of the present invention.

As shown in FIG. 2, a detail architecture diagram of the signal switch device is depicted. In normal mode, two terminals of earphone jack are respectively connected to R and F terminals of digital-to-analog converter 58 because of no any current through the field coils 72, 84 of relays 70 and 80. Thus, the audio signal can be output from the digital-to-analog converter 58. In testing mode, CPU 59 issues a high voltage signal to active the BJT 90, and then a current passes through the field coils 72,84 of the relays 70,80. In this way, two terminals of earphone jack can be switched to the receiving ($R_{XD}$) and Transmitting ($T_{XD}$) terminals of the CPU 59 for testing purpose.

Accordingly, the disc drive of the present invention provides a signal switch device, connected to the digital-to-analog converter when the audio signal is output from the disc drive and disconnected from the digital-to-analog converter when the digital signal is passed through the earphone jack. Thus, the digital signals, such as the drive test signal are input to the disc drive or output from the disc drive through the earphone jack without adding additional electrical elements, such that communicability between the disc drive and outside testing signals is increased.

The foregoing description of the preferred embodiments of the invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A disc drive using an earphone jack to transmit signals, comprising:
   a digital-to-analog converter;
   a signal switch device; and
   an earphone jack coupled to the signal switch device,
   wherein the signal switch device is coupled to the digital-to-analog converter when an audio signal is output from the disc drive through the earphone jack and the signal switch device is disconnected from the digital-to-analog converter when a non-audio signal is input or output to/from the disc drive through the earphone jack for testing the disc drive.

2. The disc drive as claimed in claim 1, wherein the disc drive further comprises a CPU to control the connection between the signal switch device and the digital-to-analog converter.

3. The disc drive as claimed in claim 1, wherein the audio signal is transformed from a digital audio signal recorded on an optical medium.

4. The disc drive as claimed in claim 1, wherein the non-audio signal is output from the disc drive responding to a drive test signal.

5. The disc drive as claimed in claim 1, wherein the earphone jack is coupled to a testing machine.

6. The disc drive as claimed in claim 5, wherein the testing machine is a personal computer.

7. The disc drive as claimed in claim 6, wherein the testing machine provides the non-audio signal.

* * * * *